United States Patent
Zhou et al.

(10) Patent No.: US 7,720,154 B2
(45) Date of Patent: May 18, 2010

(54) SYSTEM AND METHOD FOR FAST VARIABLE-SIZE MOTION ESTIMATION

(75) Inventors: Zhi Zhou, Sichuan (CN); Ming-Ting Sun, Kao-Hsiung (TW); Yuh-Feng Hsu, Hsin-Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 1431 days.

(21) Appl. No.: 10/986,649

(22) Filed: Nov. 12, 2004

(65) Prior Publication Data

US 2006/0104359 A1 May 18, 2006

(51) Int. Cl.
H04N 11/02 (2006.01)
H04N 11/04 (2006.01)
H04N 7/12 (2006.01)

(52) U.S. Cl. .......................... 375/240.16; 375/240.24; 375/240.12

(58) Field of Classification Search ............ 375/240.12, 375/16, 24
See application file for complete search history.

(56) References Cited

U.S. PATENT DOCUMENTS

| | | | |
|---|---|---|---|
| 4,796,087 A | 1/1989 | Guichard et al. | |
| 6,084,908 A | 7/2000 | Chiang et al. | |
| 6,175,593 B1 * | 1/2001 | Kim et al. | 375/240.17 |
| 2004/0247029 A1 * | 12/2004 | Zhong et al. | 375/240.16 |
| 2005/0135484 A1 * | 6/2005 | Lee et al. | 375/240.16 |
| 2007/0217514 A1 * | 9/2007 | Kumar et al. | 375/240.16 |

OTHER PUBLICATIONS

Yu-Kuang Tu, et al: "Fast Variable-Size Block Motion Estiamtion Using Merging Procedure With An Adaptive Threshold" pp. 708-711, IEEE 2003.*
Ziang Li et al., "Fast Integer Pixel Motion Estimation" Joint Video Team (JVT) of ISO/IEC MPEG7 ITU-T VCEG (ISO/IEC JTC1/SC29/WG11 and ITU-TSG16. Q.6) 6th Meeting: Awaji, Island JP, Dec. 5-13, 2002 pp. 1-11.*
Yu-Kuang Tu, et al., "Fast Variable Size Block Motion Estimation Using Merging Procedure with an Adapative Threshold", p. II708-II711, IEEE 2003.*
Ziang Li et al., "Fast Integer Pixel Motion Estimation" Joint Video Team (JVT) of ISO/IEC MPEG7 ITU-T VCEG (ISO/IEC JTC1/SC29/WG11 and ITU-TSG16.Q6) 6th Meeting: Awaji, Island JP, Dec. 5-13 2002 p. 1-11.*
Kai-Kuang Ma and Gang Qiu, "An Improved Adaptive Rood Pattern Search For Fast Block- matching Motion Estimation in JVT/H.26L", IEEE © 2003.

(Continued)

*Primary Examiner*—Andy S. Rao
*Assistant Examiner*—Jessica Roberts
(74) *Attorney, Agent, or Firm*—Alston & Bird LLP

(57) ABSTRACT

Methods and systems for fast variable block-size motion estimation based on merging and splitting procedures for AVC video encoding are disclosed. The methods take advantage of the correlation of the Motion Vectors (MVs) of the different block-size modes to achieve a good computation reduction. Considering that the smaller the block-size difference between two block-sizes is, the more correlations between their MVs can be expected, the methods use a 8*8 block as an initial processing block to calculate prediction MVs. The prediction MVs are then used in predicting MVs for other block-sizes.

20 Claims, 3 Drawing Sheets

OTHER PUBLICATIONS

Yu-Kuang Tu, et al; "Fast Variable-Size Block Motion Estimation Using Merging Procedure With An Adaptive Threshold", pp. II708-II711, IEEE © 2003.

Jun Xin, et al. "Diversity-Based Fast Block Motion Estimation", pp. II789-II792, IEEE © 2003.

Shan Zhu et al., "A New Diamond Search Algorithm for Fast Block-Matching Motion Estimation", pp. 287-290 IEEE Transaction on Image Processing, vol. 9, No. 2, Feb. 2000.

Yao Nie, et al., "Adaptive Rood Pattern Search for Fast Block-Matching Motion Estimation", pp. II1442-II1449, IEEE Transctions on Image Processing, vol. 11, No. 12, Dec. 2002.

Mehmet Kucukgoz, et al., "Early-stop and motion vetor re-using for MPEG-2 to H.264 transcoding", EBU Technical Review—Jan. 2003.

Ziang Li, et al., "Fast Integer Pixel Motion Estimation", Joint Video Team (JVT) of ISO/IEC MPEG 7 ITU-T VCEG (ISO/IEC JTC1/SC29/WG11 and ITU-T SG16 Q.6) 6th Meeting: Awaji, Island, JP, Dec. 5-13, 2002, pp. 1-11.

Alexis M. Tourapis, et al., Predictive Motion Vector Field Adaptive Search Technique (PMVFAST)—Enhancing Block Based Motion Estimation, 2001.

Zhi Zhou, et al., Fast Variable Block-Size Motion Estimation Algorithms Based on Merge and Split Procedures for H.264/MPEG-4 AVC; IEEE International Symposium On Circuits and Systems, May 2004.

* cited by examiner

SYSTEM AND METHOD FOR FAST VARIABLE-SIZE MOTION ESTIMATION

BACKGROUND

1. Field of the Invention

The present invention relates generally to a method and system of variable block-size motion estimation and more particularly, to a method and system of fast variable block-size motion estimation based on merge and split procedures for H.264/MPEG-4 AVC video encoding.

2. Background of the Invention

In current video coding standards, Motion Estimation (ME) is a core functional block to remove temporal redundancy in video sequences to achieve high compression. In the emerging H.264/MPEG-4 AVC video coding standard, for Inter coded Macroblocks (MBs), tree-structured block-sizes can be employed in the motion estimation. Each 16*16 MB can be coded in 16*16, 16*8, 8*16, and 8*8 block-modes. If the 8*8 block-mode is chosen, each 8*8 sub-macroblock can be independently partitioned into 8*8, 8*4, 4*8, and 4*4 blocks. So, altogether there can be seven different block-sizes: 16*16, 16*8, 8*16, 8*8, 8*4, 4*8, and 4*4. For these block-sizes, each 16*16 MB contains 1, 2, 2, 4, 8, 8, and 16 blocks respectively.

In the H.264/MPEG-4 AVC reference software, a Fast Full Search (FFS) algorithm is used for the ME. The SADs (Sum of Absolute Differences) of 4*4 blocks are first calculated and the SADs of the other six block-modes are calculated by summing up the SADs of the corresponding 4*4 blocks. Although the SADs in the calculation of the 4*4 block-mode are re-used, for all seven block-sizes, the SAD calculation load will be larger than that using a full-search ME for a 16*16 MB. For example, if a search-window size is 31*31 pixels and the Unrestricted Motion Vector (UMV) mode is enabled, the number of search points using the full-search ME is 31*31=961. Accordingly, the required SAD computation is larger than that for a 16*16 MB with 961 search points, which requires a lot of computations.

Recently some fast variable block-size ME algorithms have been proposed. For example, a fast search algorithm is applied to the seven block-sizes independently, as disclosed by Ma et al. in an article entitled "An Improved Adaptive Rood Pattern Search For Fast Block-matching Motion Estimation in JVT/H.26L". A merge procedure is also proposed, as disclosed by Tu et al. in "Fast Variable-size Block Motion Estimation Using Merging Procedure With an Adaptive Threshold", which determines the MVs of larger block-sizes from the MVs of smaller block-sizes, with the threshold for the merge criteria related to the quantization parameter. Kucukgoz et al. in their article entitled "Early-stop and Motion Vector Re-using for MPEG-2 to H.264 Transcoding" apply a bottom-up merge scheme and an early-stop strategy for the variable block-size ME in MPEG-2 to H.264 transcoding. Furthermore, in "Fast Integer Pixel Motion Estimation" disclosed by Li et al., a merge and split process for the ME is proposed. The disclosure, however, fails to describe the detailed process.

BRIEF SUMMARY OF THE INVENTION

Accordingly, one object of the present invention is to provide a MV prediction and MV search strategy for fast variable block-size MEs. Using the strategy, fast variable block-size ME algorithms based on merge and split procedures are proposed and described in details. Experimental results show that using these merge/split schemes, the search-points can be reduced to about 4% of that using the fast full-search ME for a 16*16 MB, with negligible quality degradation.

One embodiment of the present invention is to provide method for predicting motion vectors (MVs) of variable block sizes of a video image frame. The method includes choosing a block size as an initial processed block, wherein the initial processed block has a block size between a smallest block size a largest block size of the variable block sizes, partitioning the initial processed block into a plurality of sub-blocks and obtaining a plurality of prediction MVs from the plurality of sub-blocks. The plurality of prediction MVs are then used in subsequent steps. The initial processed block is merged into larger-size blocks and the plurality of prediction MVs are used in the merging process to predict MVs of the larger-size blocks. Further, the initial processed block is split into smaller-size blocks; and similarly, the plurality of MVs are used in the splitting process to predict MVs of the smaller-size blocks.

According to the present invention, the initial block size is 8*8. In this case, the initial block is divided into four 4*4 sub-blocks and four prediction MVs: $MV_A$, $MV_B$, $MV_C$, and $MV_D$ are calculated. The initial block is merged into 8*16, 16*8, and 16*16, and is split into 8*4, 4*8, and 4*4 blocks.

In the first preferred embodiment, if any two prediction MVs matches with each other, the matched MV is used as a prediction MV of next larger-size block. If none of the prediction MVs matches with each other, the method searches for a new MV for the larger-size block. Similarly, if the MVs of the smaller-size blocks, such as 8*4, and 4*8 blocks, are the same, the MV is used as a prediction block of the 4*4 block. Otherwise, the prediction MVs of the four sub-blocks are average and the averaged MV is used as a search center.

A second embodiment of the present invention is to provide a method for judging motion vector (MV) consistency of a block in a video image frame. The method includes dividing the block into a plurality of sub-blocks, calculating prediction MVs of the plurality of sub-blocks, comparing the prediction MVs of the plurality of sub-blocks, and if horizontal components and vertical components of any adjacent two of the plurality of sub-blocks $MV_A$ and $MV_B$ match with each other, i.e., $|MV_{A\_x} - MV_{B\_x}| == 0$ and $|MV_{A\_y} - MV_{B\_y}| == 0$, then prediction $MV_A$ is used as a reference MV for a larger-size block.

In the above embodiment, if the horizontal components and vertical components of any adjacent two of the plurality of sub-blocks $MV_A$ and $MV_B$ do not match, then the method searches MVs for a larger-size block, in which the criterion for unmatched MV is:

$$|MV_{A\_x} - MV_{B\_x}| >= 3 \text{ or } |MV_{A\_y} - MV_{B\_y}| >= 3.$$

A third embodiment of the present invention is to provide a system module for fast motion estimation of variable block sizes of a video image frame. The system includes a first motion estimation sub-module for processing an initial n×m block to obtain a plurality of prediction MVs and a merging sub-module for merging the n×m block into larger-size blocks and for receiving the plurality of prediction MVs from the first motion estimation sub-module. The merging sub-module uses the plurality of prediction MVs to calculate prediction MVs for the larger-size blocks. The system also includes a splitting sub-module for splitting the n×m block into smaller-size blocks and for receiving the plurality of prediction MVs from the first motion estimation sub-module.

The splitting sub-module uses the plurality of prediction MVs to calculate prediction MVs for the smaller-size blocks.

DETAILED DESCRIPTION OF THE INVENTION

Generally, a motion estimation algorithm considers two important components for searching the MV: search center and search pattern. Conventionally, the search center is generally predicted by taking a median value, a mean value, or that with minimum SAD from the spatial and temporal neighbors' MVs. However, this type of methods is based on the assumption that the MV field is homogeneous. In the case of a video sequence with rich local motions and relatively small moving objects, the assumption is often not valid.

Since all the different-size blocks are inside the same MB (i.e., Motion Block), it is expected that the MVs of these blocks have strong correlations. Therefore, in accordance with the present invention, it assumes that the prediction result will be better than that from its neighboring MBs if the search center of the current block is predicted from the MVs of its sub-blocks or its upper-layer blocks, especially when the motion field is not homogeneous.

To accurately obtain the correlation of different block-sizes, the initial block-size and the accuracy of the MV prediction are important. Intuitively, two methods can be employed: bottom-up merge and top-down split. In the bottom-up merge, a 4*4 block is taken as the initial block-size. Since the 4*4 block-size is relatively small, its MV can easily point to a best match but that does not necessarily represent the true motion. Thus, the MVs may not be reliable. In the top-down split, a 16*16 block is taken as the initial block-size. Due to the relatively large block-size, however, there is a higher possibility that the motion inside the block is not homogeneous. Therefore, the MVs of the sub-blocks can be different from each other and from the MV of the 16*16 block. In this case, it may take a longer process to find the MV of the sub-blocks.

Another consideration is that the smaller the block-size difference between two block-sizes is, the more correlations between their MVs can be expected. Therefore, according to the present invention, a reasonable approach is to take an 8*8 block as the initial block-size, since the block-size of 8*8 is relatively close to both the block-sizes of 16*16 and 4*4. Using an 8*8 block as the initial block-size has an additional advantage. Due to the fact that at low bit-rates, larger block-sizes are preferred in general since smaller block-sizes result in more MV overheads and at high bit-rates, small block-sizes are preferred in general since the advantage from the better predictions out-weights the MV overheads. The 8*8 block is a suitable initial block-size regardless of the bit-rates.

Figure 1:
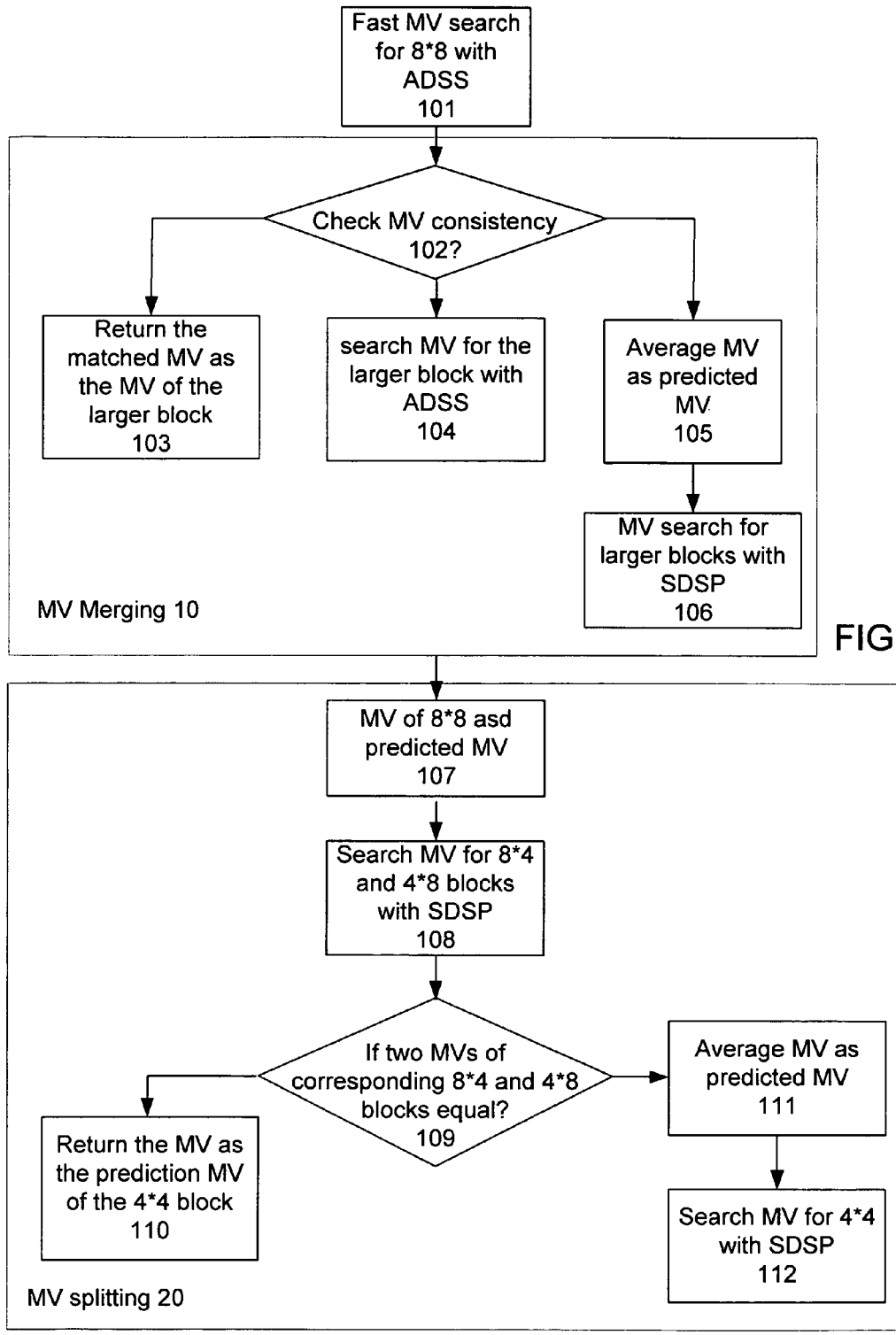
FIG. 1 is a flow chart showing fast variable block-size motion estimation in accordance with the present invention.

Accordingly, a fast ME scheme by Merge and Split, which starts from the 8*8 block-size, and merges to larger block-sizes or splits to smaller block-sizes is disclosed as shown in a preferred embodiment of FIG. 1.

In FIG. 1, a merge process 10 is first performed. That is, 8*8 blocks are merged into 8*16, 16*8, and 16*16 blocks. To illustrate the merging process, please further refers to FIG. 2 that shows 8*8 blocks 21 can be merged into 8*16 blocks 22, 16*8 blocks 23, and 16*16 blocks 24.

At step 101, an ADSS (Adaptive Diversity Search Strategy) ME is first performed for the 8*8 blocks 21 to search for its MVs. Since the MVs of the 8*8 blocks will be used for prediction in the merge and split process, the overall results are highly dependent on the accuracy of the MVs. The ADSS is used in this step since it can achieve a good PSNR (Peak Signal-to-Noise Ratio) with a reduced number of search points.

Figure 2:
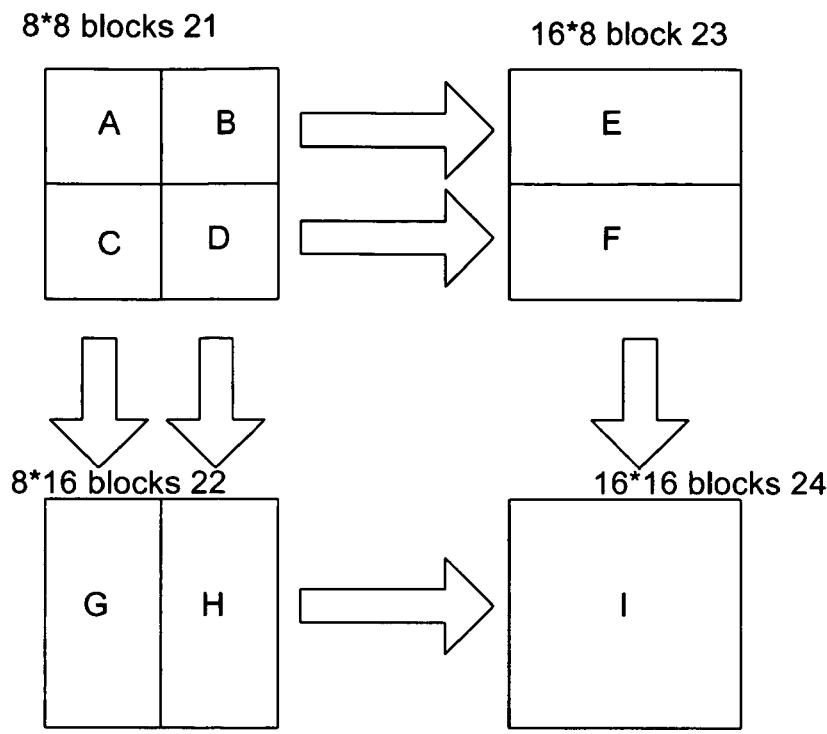
FIG. 2 is a schematic diagram showing an 8*8 block merging into 8*16, 16*8, and 16*16 blocks.

As shown in FIG. 2, the 8*8 block is divided into four sub-blocks A, B, C, and D, and the prediction MV of each of the sub-blocks is $MV_A$, $MV_B$, $MV_C$, and $MV_D$. In the merging process, sub-blocks A and B can be merged to sub-block E in the 16*8 block. Similarly, sub-block A and C can be merged to sub-block G. Therefore, if adjacent MVs, such as $MV_A$ and $MV_B$, are matched, $MV_A$ (or $MV_B$) is used as a prediction MV of sub-block E of a 16*8 larger block size. However, if none of the adjacent MVs matched with each other, the process then search the MVs for larger block-sizes. Otherwise, $MV_A$, $MV_B$, $MV_C$, and $MV_D$ are averaged and the average MV is used for search MV for larger block sizes. The determination of matched MV, unmatched MV and averaging MV will be described in more detail later.

The match MV is determined at step 102 of FIG. 1 according to the following equation:

$$|MV_{A\_x}-MV_{B\_x}|==0 \text{ and } |MV_{A\_y}-MV_{B\_y}|==0.$$

wherein $MV_{A\_x}$ and $MV_{A\_y}$ are horizontal component and vertical components of prediction $MV_A$ and $MV_{B\_x}$ and $MV_{B\_y}$ are horizontal component and vertical component of prediction $MV_B$, respectively. As described, when the horizontal and vertical components of $MV_A$ and $MV_B$ matches, $MV_A$ will be considered as the MV of a larger block (i.e., 8*16, 16*8, and 16*16), as shown at step 103.

Again, at step 102, if none of sub-blocks A-D of the 8*8 blocks matches with each other, the process searches the MV for the larger block-sizes with ADSS, as shown at step 104. According to the present invention, the criterion for determining unmatched MV follows:

$$|MV_{A\_x}-MV_{B\_x}|>=3 \text{ or } |MV_{A\_y}-MV_{B\_y}|>=3.$$

At steps 105 and 106, for those search results other than matched MVs as shown at step 103 and unmatched MVs as shown at step 104, the process averages MV as the prediction MV, and performs the MV search for larger blocks such as 8*16, 16*8, and 16*16 blocks. The process for steps 105 and 106 are described as below.

The MV predictions for larger block sizes, i.e., 8*16 and 16*8 blocks can be performed as follows:

$$PMV_E=(MV_A+MV_B)/2$$

$$PMV_F=(MV_C+MV_D)/2$$

$$PMV_G=(MV_A+MV_C)/2$$

$$PMV_H=(MV_B+MV_D)/2 \qquad (1)$$

After the above MV predictions, a fast MV search procedure, which is as described above with reference to steps 101-102 and 104-105, is performed to find the MVs for the blocks E, F, G, and H. After the MVs for blocks E, F, G, and H are obtained, the MV prediction for a 16*16 MB can be calculated as follows:

$$PMV_I = (MV_E + MV_F + MV_G + MV_H)/4 \quad (2)$$

In addition, the present invention utilizes a Cumulative Distribution Function (CDF) of "the delta MVs between the Prediction MVs and the MVs by Full-Search is less or equal to d pixels", to fine-tune the accuracy of the MV estimation. The CDF is defined by Equation (3):

$$P(delta\_MV <= d) = \quad (3)$$
$$P\left(\bigcup_{i \in \{16*8, 8*16, 16*16\}} (|PMV_{i\_x} - MV_{i\_x}| + |PMV_{i\_y} - MV_{i\_y}|) <= d\right)$$

where $PMV_{i\_x}$ and $PMV_{i\_y}$ is the horizontal component and the vertical component of the prediction MV for block i respectively, $MV_{i\_x}$ and $MV_{i\_y}$ are MV components by the Full-Search, "∪" represents "or", which includes all predicted modes (16*8, 8*16, and 16*16) using Equation (1) and (2), and d is an integral no greater than 3.

The CDF with up to three pixels (i.e., d=3) offset is listed in Table-1. d=0 means that the MVs by Full-Search and predicted MV by the present invention are the same. In this case, the average of the MVs of the smaller-size blocks is taken as the MV for the larger-size blocks, which is similar to that in a pure merge process, the accuracy is only 49%, 49%, 68%, and 49% for the four sequences simulated, respectively. However, if the average of the MVs is taken as the prediction MV for the larger size blocks, followed by a one-pixel SDSP (Small Diamond Search Pattern) search, the accuracy can be improved to 85%, 86%, 89% and 85% of the 16*8, 8*16 and 16*16 blocks, respectively. By three-steps of SDSP (that is, d=3 pixels), the accuracy rate can be as high as 97%, 98%, 96% and 94%. Similar conclusions can also be drawn from Table-2 and 3, which show CDF results for smaller blocks after a split process by using the SDSP. Tables-2 and 3 will be described later.

TABLE 1

CDF of MV difference between MVs by Full-Search and predicted MVs for 16 * 16, 16 * 8, and 8 * 16 blocks

|  | d = 0 | d = 1 | d = 2 | d = 3 |
|---|---|---|---|---|
| Foreman QCIF | 49.44% | 84.99% | 93.50% | 96.62% |
| Coast Guard CIF | 49.04% | 86.18% | 94.95% | 97.83% |
| MAD CIF | 68.00% | 88.96% | 93.97% | 96.07% |
| Mobile CIF | 48.58% | 85.41% | 91.48% | 93.52% |

(Search range = [−16, 15], Fixed QP = 30, frame distance = 1.)

Figure 3:
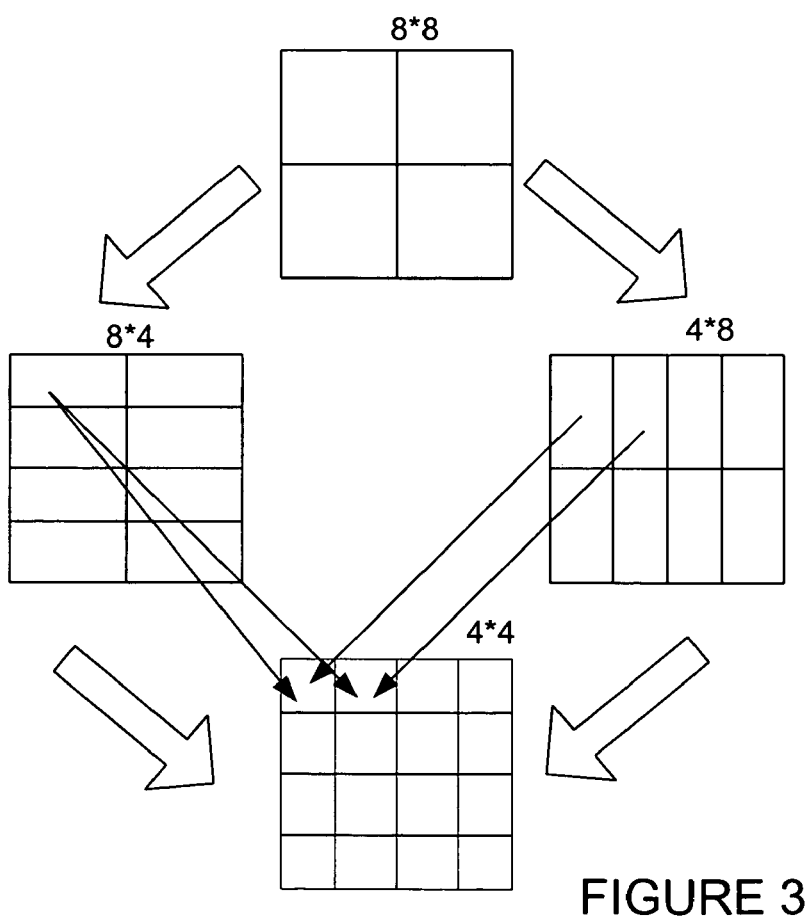
FIG. 3 is a schematic diagram showing an 8*8 block splitting into 8*4, 4*8, and 4*4 blocks.

Again refer to FIG. 1. After obtaining estimated MVs of the larger block sizes, the estimated MVs of smaller block sizes can be performed by splitting process 20. In this case, the 8*8 blocks are split into 8*4, 4*8, and 4*4 block-sizes, as shown at step 105. The split from 8*8 blocks 31 into 8*4 blocks 32 and 4*8 blocks 33 and then into 4*4 blocks is further illustrated in FIG. 3.

As shown at steps 107 and 108, splitting process 20 first takes the MV of the corresponding larger-block as the prediction MV and performs the SDSP search and searches MV for 8*4 and 4*8 blocks with the SDSP.

At step 109, if the two MVs of the corresponding 8*4 and 4*8 blocks equal to each other, then the MV is returned as the MV of the 4*4 block, as shown at step 110. Otherwise, the process calculates an average MV as a predicted MV, at step 111, and searches MV for the 4*4 block with SDSP, at step 112.

After MV for the 4*4 block is estimated, the splitting process is completed.

The CDF of MV difference between the MVs by Full-Search and the predicted MVs for 8*4 and 4*8 blocks is shown in Table-2.

For splitting from 8*4 blocks and 4*8 blocks to 4*4 blocks, since there are two larger blocks covering each 4*4 block, the average MV is taken for prediction. The CDF of the MV difference is shown in Table-3.

TABLE 2

CDF of MV difference between MVs by Full-Search and predicted MVs for 8 * 4, and 4 * 8 blocks

|  | d = 0 | D = 1 | d = 2 | d = 3 |
|---|---|---|---|---|
| Foreman QCIF | 72.25% | 89.47% | 95.27% | 97.30% |
| Coast Guard CIF | 67.49% | 89.37% | 95.23% | 97.00% |
| MAD CIF | 82.37% | 92.42% | 96.07% | 97.48% |
| Mobile CIF | 68.60% | 88.10% | 92.84% | 94.51% |

TABLE 3

CDF of MV difference between MVs by Full-Search and predicted MVs for 4 * 4 blocks

|  | d = 0 | d = 1 | d = 2 | d = 3 |
|---|---|---|---|---|
| Foreman QCIF | 66.06% | 92.38% | 96.92% | 98.20% |
| Coast Guard CIF | 62.82% | 92.40% | 95.60% | 96.90% |
| MAD CIF | 77.38% | 94.43% | 97.04% | 97.81% |
| Mobile CIF | 60.07% | 86.55% | 91.52% | 93.71% |

Figure 4:
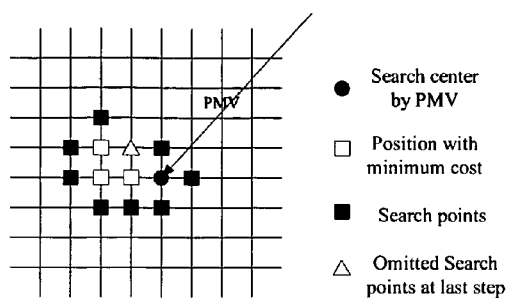
FIG. 4 is a schematic diagram showing a SDSP MV search.

In accordance with the present invention, in addition to taking the predicted MV from the simple merge or split process as the final MV, an MV search with SDSP is also applied after the MV prediction. FIG. 4 shows a SDSP MV search pattern utilized in the present invention. SDSP is the search pattern for the last step of Diamond Search (DS), which consists of four checking points surrounding a current position. In the preferred embodiment, the proposed MV search process continues with SDSP until the point with the minimum cost is at the SDSP center or the number of search steps exceeds 3. Setting the maximum number of search steps to 3 is to prevent a long search process when the two prediction MVs are close to each other while the best matching point is far away, although this rarely occurs. If it occurs, apply ADSS instead of SDSP. If the current search point overlaps with previous search points, skip the point.

The number of search points per MB is calculated in the unit of the SAD calculations needed for a search point for the block-size of 16*16. Since the SAD calculation varies for different block-size, a calculation weight is applied to search points of each block-size, which is defined as:

$$SP_{MB} = \sum_{i=1}^{7} W_i \left( \sum_{j=1}^{N_i} SP_{ij} \right) \quad (4)$$

In Equation (4), $SP_{MB}$ is the number of search points per MB. $N_i$ is the number of blocks in one MB for block-mode i: $N_i = 1, 2, 2, 4, 8, 8, 16$ for 16*16, 16*8, 8*16, 8*8 8*4, 4*8 and 4*4 mode respectively. $SP_{ij}$ the number of search points for the block with mode i and block serial number j. $W_i$ is the calculation complexity weight for different block sizes.

$W_i$=1, ½, ½, ¼, ⅛, ⅛ and 1/16 for 16*16, 16*8, 8*16, 8*8, 8*4, 4*8, and 4*4 mode respectively.

The search points for the Merge and Split algorithm of the present invention come from two processes: one is the ADSS process for the 8*8 blocks, the other is from the MV search after the prediction for other block-sizes. Generally, the number of ADSS search points is less than that by DS, which is at least 13 points. Note that for the splitting from 8*8 blocks to 8*4 and 4*8 blocks, the number of MV search points is at least 5 points. For other parts of the merge and split process, the search points can be either 0, or at least 5 points.

The simulation results of a preferred embodiment of the present invention will be described below. Based on the MV prediction and the MV search procedures as mentioned above, three merge/split schemes: bottom-up merge, top-down split, and merge-split, are implemented in the present invention. For the bottom-up merge that begins with 4*4 blocks, if the two MVs of the two smaller-size blocks are equal to each other, then return the MV as the MV for the larger block's MV without the MV search. Otherwise, it calculates an average MV as the prediction MV and performs the SDSP search. For the top-down split that begins with 16*16 blocks, the MV of larger block is taken as prediction MV and SDSP is always performed for all smaller blocks.

DS and ADSS are also implemented in the stimulation experiments for comparisons. The two approaches are applied to seven block-sizes independently. For DS, the minimum number of search points for each block-size is 13. Therefore, for seven block-sizes, the number of search points is 13*7=91. For ADSS, the number of search points is less than that of DS, especially for low motion sequences such as the Mother and Daughter sequence.

Further, the simulation conditions are: Frame-rate=30 frames/s, Search range=[-16, +15]. Therefore, the comparisons of PSNR, bit rate, and search point are shown in Table-4 as below.

TABLE 4

Comparison of PSNR, bit-rate, and search points (SP: Search Points)

| | PSNR | Bit-rate (kb/s) | SP per MB |
|---|---|---|---|
| Foreman QCIF, QP = 30 | | | |
| FFS | 34.82 | 161.78 | 961 |
| DS | 34.75 | 162.18 | 107.45 |
| ADSS | 34.79 | 161.24 | 76.43 |
| Merge & Split | 34.77 | 163.62 | 33.62 |
| Bottom-up Merge | 34.71 | 164.45 | 32.47 |
| Top-down Split | 34.72 | 161.42 | 35.87 |
| Coast Guard CIF, QP = 30 | | | |
| FFS | 33.18 | 1058.39 | 961 |
| DS | 33.15 | 1054.55 | 104.84 |
| ADSS | 33.17 | 1057.55 | 103.92 |
| Merge & Split | 33.15 | 1067.53 | 39.38 |
| Bottom-up Merge | 33.11 | 1074.73 | 40.06 |
| Top-down Split | 33.10 | 1051.00 | 39.74 |
| Mother and Daughter CIF, QP = 30 | | | |
| FFS | 36.79 | 393.17 | 961 |
| DS | 36.76 | 394.97 | 109.40 |
| ADSS | 36.78 | 393.30 | 64.86 |
| Merge & Split | 36.75 | 396.59 | 28.43 |
| Bottom-up Merge | 36.74 | 400.38 | 23.96 |

TABLE 4-continued

Comparison of PSNR, bit-rate, and search points (SP: Search Points)

| | PSNR | Bit-rate (kb/s) | SP per MB |
|---|---|---|---|
| Top-down Split | 36.75 | 395.26 | 32.51 |
| Mobile CIF, QP = 30 | | | |
| FFS | 32.71 | 2084.64 | 961 |
| DS | 32.69 | 2073.08 | 106.97 |
| ADSS | 32.72 | 2074.63 | 94.18 |
| Merge & Split | 32.70 | 2096.26 | 36.45 |
| Bottom-up Merge | 32.69 | 2127.02 | 36.88 |
| Top-down Split | 32.62 | 2075.02 | 36.78 |

From the above simulation results, it is noted that the proposed merge-split, bottom-up merge, and top-down split schemes all achieve reasonably good results. For consistent motion sequences such as "Mother and Daughter," usually the MVs of the larger block-sizes are the same as the MVs of the smaller block-sizes. In these cases, the MV search around the search center is not necessary. However, for the "top-down split" scheme, it always performs the MV search around the search-center for all block-sizes, so it is not as efficient as it could be. Further, the PSNR and the bit-rate are very close to "merge-split", but the MV search needs more calculations. On the contrary, for "bottom-up merge," consistent motion sequences result in less search points, since for consistent MVs of smaller blocks, MV search is not necessary for larger blocks.

Figure 5:
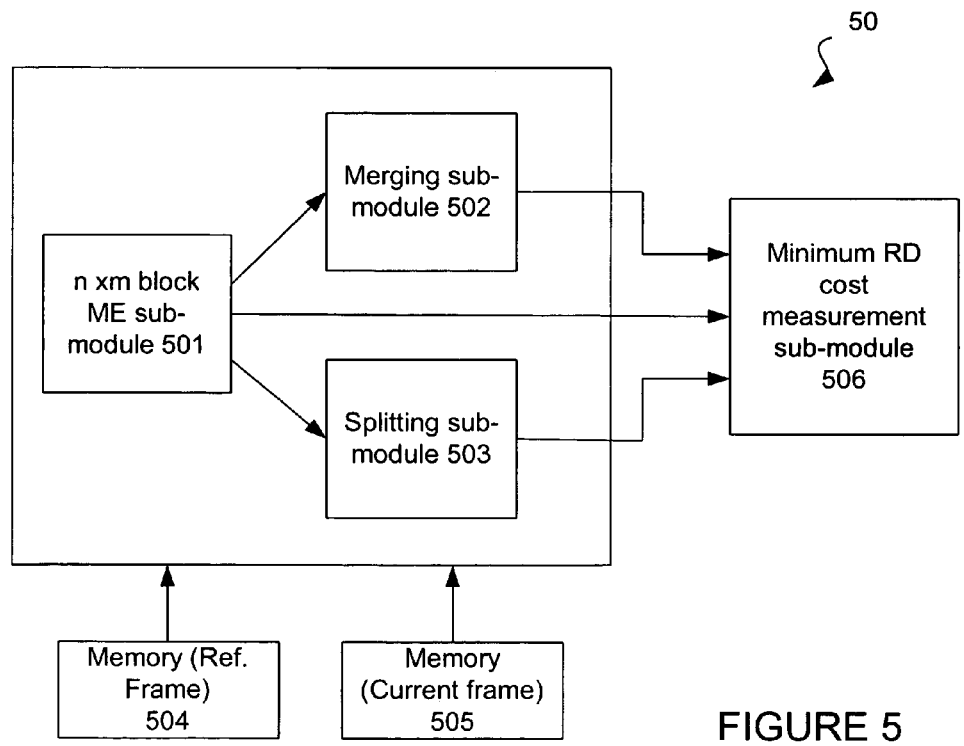
FIG. 5 is a schematic diagram of a system module for fast variable block-size motion estimation in accordance with the present invention.

FIG. 5 illustrates system module 50 for fast variable block-size ME in accordance with the present invention. As shown, sub-module 501 first performs a motion estimation for a n×m block of a video image. As described above, for a 16*16 block, it first take the 8*8 block as the initial block-size for MV predictions since the 8*8 block size is relatively close to 16*16 and 4*4 block sizes. Therefore, sub-module 501 processes the 8*8 block to generate four prediction MVs by means of the ADSS or any other suitable method. The ADSS has been described above with reference to FIG. 1. The predicted MVs of the 8*8 block will be later used for prediction in merging and split processes. System module 50 further comprises memory sub-modules 504 and 505 that provide reference frame and current frame image information, respectively, to the system.

Merging sub-module 502 next receives the MVs from MV prediction sub-module 101 and performs a merging process on the 8*8 block. The merging process has been described above in FIG. 1 and thus no details need to be described here. Basically, the 8*8 block is merged to 8*16, 16*8, and 16*16 blocks. Sub-module 502 uses the received MVs to predict MVs of the three larger blocks and outputs the predicted MVs to minimum RD cost measurement sub-module 506.

The output of MV prediction sub-module 501 can be further applied to splitting sub-module 503 for performing a splitting process. Similarly, the splitting process has been described above in FIG. 1 and thus no details need to be described here. In summary, the 8*8 blocks are split into 4*8, 8*4, and 4*4 blocks. Sub-module 503 take the MVs of the 8*8 block processed in sub-module 501 as the prediction MVs and performs the SDSP search. If two MVs of the corresponding 8*4, and 4*8 blocks equal to each other, then return the MV as the MV of the 4*4 block. Otherwise, the MVs are averaged and the averaged MV is taken as the MV search center. The MV output by splitting sub-module 503 is also applied to minimum RD cost measurement module 506 for further processing.

In accordance with the present invention, the merging process and the splitting process are not necessarily performed at the same time. For example, in a bottom-up embodiment wherein n and m both equal to 4, only merging process is necessary. In this case, merging sub-module 502 merges the 4*4 blocks into 4*8, 8*4, 8*8, 8*16, 16*8, and 16*16 blocks. In the contrary, in a top-down embodiment wherein n and m both equal to 16, no merging process is necessary. In this case, only splitting sub-module 503 is required to split the 16*16 block into 16*8, 8*16, 8*8, 8*4, 4*8, and 4*4 blocks.

Finally, minimum RD (Rate Distortion) measurement sub-module 506 integrates all MVs and prediction errors generated by merging sub-module 502 and splitting sub-module 503 to calculate a minimum Lagrangian cost by using the MVs as Rate and prediction errors as Distortion. As the Lagrangian cost measurement is conventional and is not within the realm of the present invention, its description is omitted here. After the process of sub-module 506, a Block Mode and MVs of the images are determined.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for predicting motion vectors (MVs) of variable block sizes of a video image frame, comprising:

choosing, via a system module, a block size as an initial processed block, wherein the initial processed block has a block size between a smallest block size and a largest block size of the variable block sizes;

partitioning the initial processed block into a plurality of sub-blocks;

obtaining a plurality of prediction MVs of the plurality of sub-blocks;

merging the plurality of sub-blocks into larger-size blocks;

using the plurality of prediction MVs of the plurality of sub-blocks to generate prediction MVs of the larger-size blocks; and performing a fine-tune process to fine-tune the prediction MVs of the larger-size blocks, the fine-tune process offsetting the prediction MVs of the larger-size blocks by less than or equal to a number of pixels from the prediction MVs, wherein the fine-tune process is a Cumulative Distribution Function (CDF) process being defined by the following equation:

$$P(\text{delta\_MV} <= d) =$$
$$P\left(\bigcup(|PMV_{i\_}x - MV_{i\_}x| + i \in \{16*8, 8*16, 16*16\}\right.$$
$$\left.|PMV_{i\_}y - MV_{i\_}y|) <= d\right)$$

wherein $PMV_{1\_}x$ and $PMV_{i\_}y$ are a horizontal component and a vertical component of the prediction MV for block I, respectively, $MV_{i\_}x$ and $MV_{i\_}y$ are MV components by the Full-Search pattern, "∪" represents "or", which includes all predicted blocks, and d is an integral no larger than 3.

2. The method of claim 1, wherein the initial processed block is a 8*8 block.

3. The method of claim 2, wherein the initial processed block is merged into 8*16, 16*8, and 16*16 blocks.

4. The method of claim 3, wherein the prediction MVs of the larger-size blocks are calculated by the following equations:

$$PMV_E=(MV_A+MV_B)/2$$

$$PMV_F=(MV_C+MV_D)/2$$

$$PMV_G=(MV_A+MV_C)/2$$

$$PMV_H=(MV_B+MV_D)/2$$

wherein $MV_A$, $MV_B$, $MV_C$, and $MV_D$ are the prediction MVs of four sub-blocks of the initial processed block, $PMV_E$ and $PMV_F$ are prediction MVs of two sub-blocks of the 16*8 block, and $PMV_G$ and $PMV_H$ are prediction MVs of two sub-blocks of the 8*16 block.

5. The method of claim 4, wherein a prediction $PMV_1$ of the 16*16 block is calculated by the following equation:

$$PMV_1=(MV_E+MV_F+MV_G+MV_H)/4.$$

6. The method of claim 1, wherein the plurality of prediction MVs of the plurality of sub-blocks are obtained by calculating Sum of Absolute Differences (SAD) of the plurality sub-blocks.

7. The method of claim 1, wherein if horizontal components and vertical components of any two adjacent prediction MVs of the plurality of sub-blocks match with each other, the matched prediction MV is taken as a reference MV of a larger-size block corresponding the two adjacent prediction MVs to obtain a prediction MV of the larger-size block.

8. The method of claim 1, wherein if none of the horizontal components and vertical components of any two adjacent prediction MVs of the plurality of sub-blocks match with each other, the process searches for a reference MV for a larger-size block.

9. The method of claim 1, further comprising:

splitting the initial processed block into smaller-size blocks; and using the plurality of prediction MVs of the plurality of sub-blocks to generate prediction MVs of the smaller-size blocks.

10. The method of claim 9, wherein the initial processed block is split into 8*4, 4*8, and 4*4 blocks.

11. A method for predicting motion vectors (MVs) of variable block sizes of a video image frame, comprising:
- choosing a block size as an initial processed block, wherein the initial processed block has a block size between a smallest block size and a largest block size of the variable block sizes;
- partitioning the initial processed block into a plurality of sub-blocks;
- obtaining a plurality of prediction MVs from the plurality of sub-blocks;
- splitting the plurality of sub-blocks into smaller-size blocks;
- using the plurality of prediction MVs of the plurality of sub-blocks to generate prediction MVs of the smaller-size blocks; and
- performing a fine-tune process to fine-tune the prediction MVs of the smaller-size blocks, the fine-tune process offsetting the prediction MVs of the smaller-size blocks by less than or equal to a number of pixels from the prediction MVs wherein the fine-tune process is a Cumulative Distribution Function (CDF) process being defined by the following equation:

$$P(\text{delta\_MV} <= d) = P\left(\bigcup (|PMV_{i\_}x - MV_{i\_}x| + i \in \{16*8, 8*16, 16*16\}\right.$$
$$\left. |PMV_{i\_}y - MV_{i\_}y|) <= d\right)$$

wherein $PMV_{i\_}x$ and $PMV_{i\_}y$ are a horizontal component and a vertical component of the prediction MV for block I, respectively, $MV_{i\_}x$ and $MV_{i\_}y$ are MV components by the Full-Search pattern, "∪" represents "or", which includes all predicted blocks, and d is an integral no larger than 3.

12. The method of claim 11, wherein the initial processed block is a 8*8 block.

13. The method of claim 12, wherein the initial processed block is split into 8*4, 4*8, and 4*4 blocks.

14. The method of claim 13, wherein a MV of the 8*8 block is used as a prediction MV of the 4*8 and 8*4 blocks.

15. The method of claim 14, wherein the prediction MV is used for searching for MVs of the 8*4 and 4*8 blocks with a Small Diamond Search Pattern (SDSP).

16. The method of claim 15, wherein if two MVs of corresponding 8*4 and 4*8 blocks equal to each other, the equal MV is returned as a prediction MV of the 4*4 blocks.

17. The method of claim 16, wherein if two MVs of corresponding 8*4 and 4*8 blocks do not equal to each other, the two MVs are averaged to obtain a prediction MV and a MV for the 4*4 blocks is searched with the SDSP.

18. The method of claim 11, wherein the plurality of prediction MVs of the plurality of sub-blocks are obtained by calculating Sum of Absolute Differences (SAD) of the plurality sub-blocks.

19. The method of claim 11, further comprising:
- merging the initial processed block into larger-size blocks; and
- using the plurality of prediction MVs of the plurality of sub-blocks to generate prediction MVs of the larger-size blocks.

20. The method of claim 19, wherein the initial processed block is merged into 8*16, 16*8, and 16*16 blocks.

* * * * *

UNITED STATES PATENT AND TRADEMARK OFFICE
CERTIFICATE OF CORRECTION

PATENT NO. : 7,720,154 B2  
APPLICATION NO. : 10/986649  
DATED : May 18, 2010  
INVENTOR(S) : Zhou et al.

It is certified that error appears in the above-identified patent and that said Letters Patent is hereby corrected as shown below:

On the Title page,
Item (73) Assignee, "Industrial Technology Research Institute, Hsinchu (TW)" should read
--Industrial Technology Research Institute, Hsinchu (TW); University of Washington, Seattle, WA (US)--.

Signed and Sealed this
Fourteenth Day of June, 2011

David J. Kappos
*Director of the United States Patent and Trademark Office*